(12) United States Patent
Schneider et al.

(10) Patent No.: US 10,261,693 B1
(45) Date of Patent: Apr. 16, 2019

(54) STORAGE SYSTEM WITH DECOUPLING AND REORDERING OF LOGICAL AND PHYSICAL CAPACITY REMOVAL

(71) Applicant: EMC IP Holding Company LLC, Hopkinton, MA (US)

(72) Inventors: Zvi Schneider, Tel Aviv (IL); Anton Kucherov, Dudley, MA (US); Uri Shabi, Tel Mond (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/884,577

(22) Filed: Jan. 31, 2018

(51) Int. Cl.
  *G06F 3/06* (2006.01)
  *G06F 12/02* (2006.01)

(52) U.S. Cl.
  CPC ............ *G06F 3/0608* (2013.01); *G06F 3/067* (2013.01); *G06F 3/068* (2013.01); *G06F 3/0631* (2013.01); *G06F 3/0641* (2013.01); *G06F 12/023* (2013.01); *G06F 2212/657* (2013.01)

(58) Field of Classification Search
  None
  See application file for complete search history.

(56) References Cited

U.S. PATENT DOCUMENTS

| | | | |
|---|---|---|---|
| 9,104,326 B2 | 8/2015 | Frank et al. | |
| 2005/0193169 A1* | 9/2005 | Ahluwalia | G06F 12/1009 711/115 |
| 2010/0115226 A1* | 5/2010 | Ueno | G06F 12/023 711/173 |
| 2016/0124661 A1* | 5/2016 | Kurita | G06F 3/0616 711/114 |
| 2016/0378680 A1* | 12/2016 | Sha | G06F 12/1009 711/209 |
| 2017/0315879 A1* | 11/2017 | Park | G06F 11/1469 |
| 2017/0315891 A1* | 11/2017 | Park | G06F 11/2094 |

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Kevin Verbrugge
(74) *Attorney, Agent, or Firm* — Ryan, Mason & Lewis, LLP

(57) ABSTRACT

A storage system in one embodiment comprises a plurality of storage devices configured to store user data pages and metadata pages. Each of the user data pages has a logical address and a content-based signature derived from content of that data page, and each of the metadata pages characterizes a plurality of the user data pages and associates the content-based signatures of those user data pages with respective physical blocks in the storage devices. In conjunction with release of logical address space in the storage system, the released logical address space is made available to users in a first order based at least in part on released logical address, and multiple dereferencing operations are accumulated for respective ones of the physical blocks corresponding to the released logical address space. The accumulated dereferencing operations for the physical blocks are executed in a second order that differs from the first order.

20 Claims, 7 Drawing Sheets

(56) References Cited

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.
EMC Corporation, "Introduction to XtremIO Virtual Copies," White Paper, Mar. 2016, 39 pages.
EMC Corporation, "XtremIO Data Production (XDP): Flash-Specific Data Protection, Provided by XtremIO (Ver. 4.0)," White Paper, Apr. 2015, 25 pages.
Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
ITZIKR, "DellEMC XtremIO X2/X1 Management, Part 1, The CAS Architecture = Simplicity'?," https://xtremio.me/2017/05/08/dellemc-xtremio-x2x1-management-part-1-the-cas-architecture-simplicity/, May 8, 2017, 6 pages.
EMC Corporation, "High Availability, Data Protection and Data Integrity in the XtremIO Architecture," White Paper, Apr. 2015, 28 pages.
ITZIKR, "DellEMC XtremIlO X2 Tech Preview #2—Native Replication," https://xtremio.me/2017/05/09/dellemc-xtremio-x2-tech-preview-2-native-replication/, May 9, 2017, 8 pages.
Dell EMC, "Introduction to Dell EMC XtremIO X2 Storage Array—A Detailed Review," Dell EMC White Paper, Aug. 2017, 46 pages.
EMC Corporation, "EMC Recoverpoint Replication of XtremIO: Understanding the Essentials of RecoverPoint Snap-Based Replication for XtremIO," EMC White Paper, Aug. 2015, 31 pages.

* cited by examiner

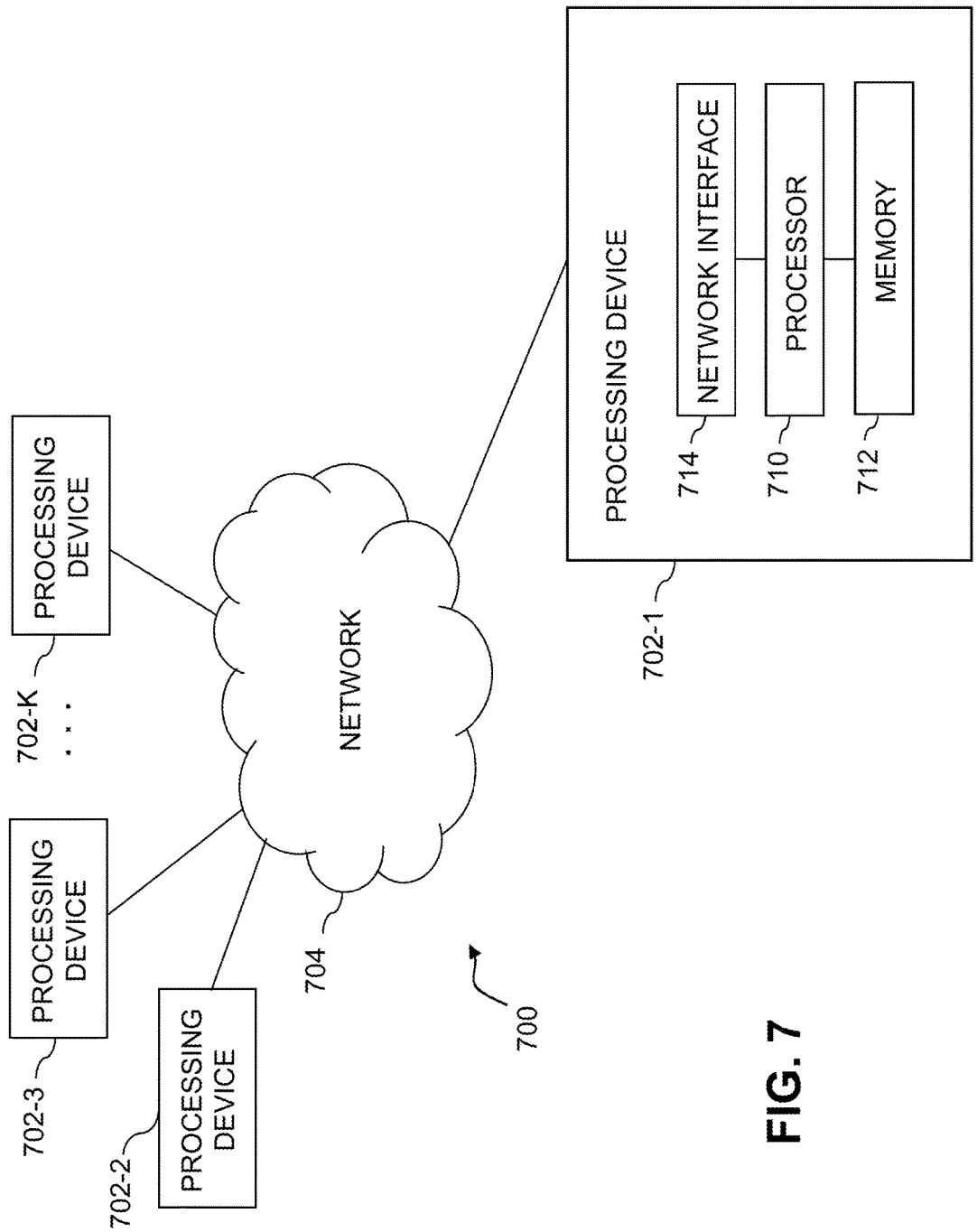

STORAGE SYSTEM WITH DECOUPLING AND REORDERING OF LOGICAL AND PHYSICAL CAPACITY REMOVAL

FIELD

The field relates generally to information processing systems, and more particularly to storage in information processing systems.

BACKGROUND

In many storage systems, it is desirable to provide efficient release of storage capacity, for example, as such storage capacity becomes available due to deletion of storage volumes, in order to better accommodate the input-output (IO) processing demands of system users. However, conventional approaches to storage capacity release can be problematic. For example, in content addressable storage systems, release of logical capacity is typically tightly coupled with release of corresponding physical capacity. This creates inefficiencies that can significantly undermine system performance.

SUMMARY

Illustrative embodiments provide techniques for decoupling and reordering of logical and physical capacity removal in a storage system. Such embodiments can advantageously provide highly efficient release of both logical and physical capacity in the storage system. This is achieved in some embodiments by decoupling logical capacity release from physical capacity release in a manner that permits logical and physical capacity release to be carried out in respective different orders each better suited to its corresponding capacity type, thereby avoiding the inefficiencies of conventional tightly coupled arrangements. Storage system performance is therefore significantly improved.

These embodiments illustratively include a clustered implementation of a content addressable storage system having a distributed storage controller. Similar advantages can be provided in other types of storage systems.

In one embodiment, an apparatus comprises a storage system that includes a plurality of storage devices and an associated storage controller. The storage devices are configured to store user data pages and metadata pages. Each of the user data pages has a logical address and a content-based signature derived from content of that data page, and each of the metadata pages characterizes a plurality of the user data pages and associates the content-based signatures of those user data pages with respective physical blocks in the storage devices.

In conjunction with release of logical address space in the storage system, the storage controller is configured to make the released logical address space available to users in a first order based at least in part on released logical address, to accumulate multiple dereferencing operations for respective ones of the physical blocks corresponding to the released logical address space, and to execute the accumulated dereferencing operations for the physical blocks in a second order that differs from the first order.

Making the released logical address space available to users in a first order illustratively comprises making the released logical address space available to users in order of released logical address. For example, making the released logical address space available to users in order of released logical address may comprise making each released logical address immediately available responsive to that logical address being released.

In some embodiments, accumulating multiple dereferencing operations for respective ones of the physical blocks corresponding to the released logical address space and executing the accumulated dereferencing operations for the physical blocks further comprise accumulating multiple dereferencing operations for each of at least a subset of the metadata pages, and executing the accumulated dereferencing operations for a given one of the metadata pages responsive to the accumulated dereferencing operations for the given metadata page reaching a threshold number of dereferencing operations.

The storage controller may be further configured to adjust the threshold number of dereferencing operations over time based at least in part on variations in IO processing load of the storage system. The threshold number of dereferencing operations may be selected so as to achieve a target dereferencing amortization rate for one or more of the metadata pages. The target dereferencing amortization rate is generally configured so as to provide release of physical blocks at a rate sufficient to satisfy physical block demand of user IO processing requirements within the storage system.

Executing the accumulated dereferencing operations for the physical blocks illustratively comprises, for each of the dereferencing operations, decrementing a reference count of a corresponding one of the physical blocks, and releasing the physical block responsive to the reference count reaching a designated number such as zero.

Additionally or alternatively, executing the accumulated dereferencing operations for the physical blocks in some embodiments comprises reordering at least a subset of the accumulated dereferencing operations into an order that more closely matches a physical layout of the corresponding physical blocks on the storage devices, and executing the reordered dereferencing operations in that order.

The storage system in some embodiments comprises a content addressable storage system implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIGS. 6 and 7 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
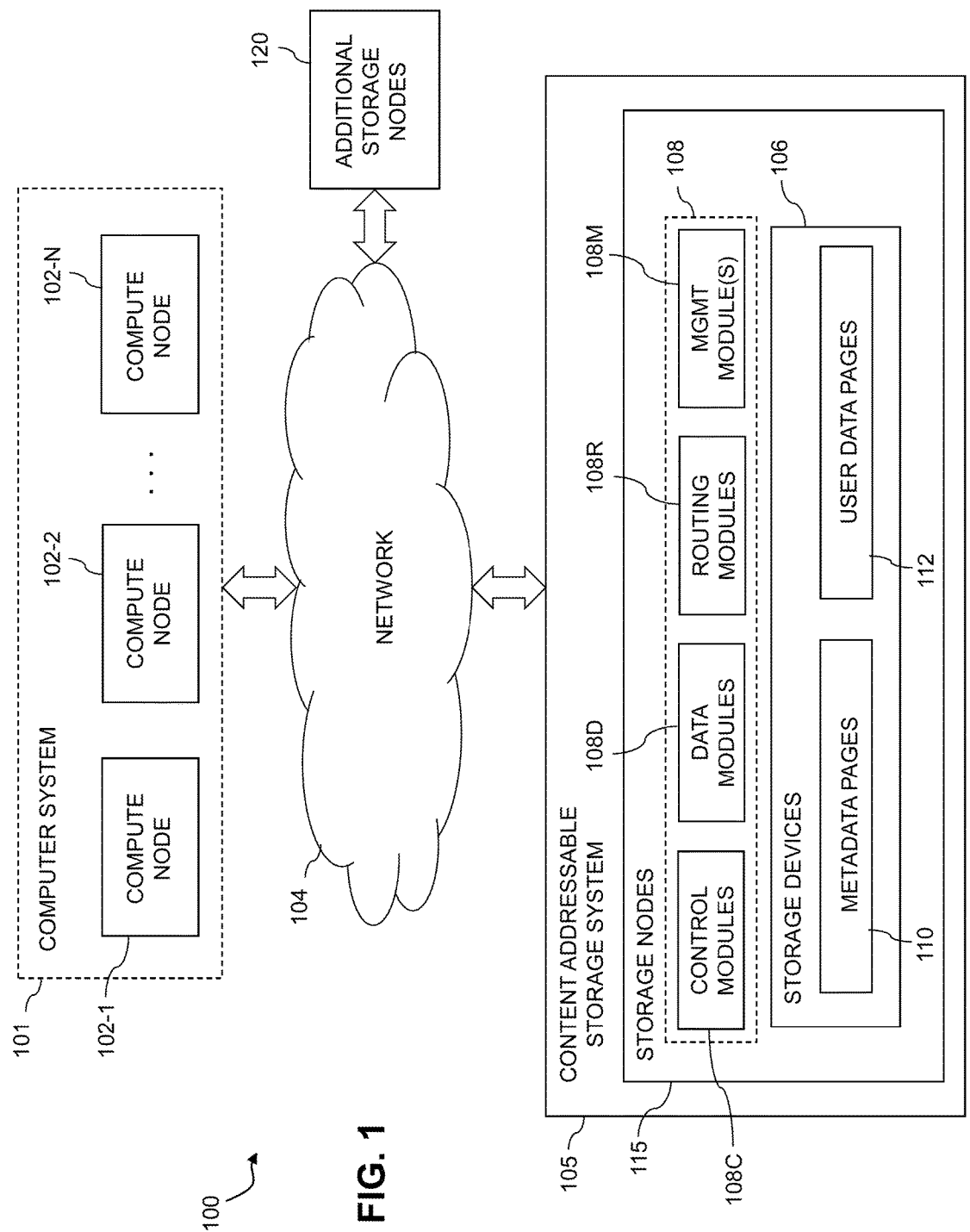
FIG. 1 is a block diagram of an information processing system comprising a content addressable storage system configured with functionality for decoupling and reordering of logical and physical capacity removal in an illustrative embodiment.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a content addressable storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 may be viewed as examples of what are more generally referred to herein as "host devices" or simply "hosts." Such host devices are configured to write data to and read data from the content addressable storage system 105. The compute nodes 102 and the content addressable storage system 105 may be implemented on a common processing platform, or on separate processing platforms. A wide variety of other types of host devices can be used in other embodiments.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

Such users of the storage system 105 in some cases are referred to herein as respective "clients" of the storage system 105.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the compute nodes 102 of the computer system 101 over the network 104. The content addressable storage system 105 comprises a plurality of storage devices 106 and an associated storage controller 108. The storage devices 106 are configured to store metadata pages 110 and user data pages 112, and may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB or other values can be used. Accordingly, illustrative embodiments can utilize any of a wide variety of alternative paging arrangements for organizing the metadata pages 110 and the user data pages 112.

The user data pages 112 are part of a plurality of logical units (LUNs) configured to store files, blocks, objects or other arrangements of data, each also generally referred to herein as a "data item," on behalf of users associated with compute nodes 102. Each such LUN may comprise particular ones of the above-noted pages of the user data area. The user data stored in the user data pages 112 can include any type of user data that may be utilized in the system 100. The term "user data" herein is therefore also intended to be broadly construed.

It is assumed in the present embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective ones of the user data pages 112 and corresponding physical locations of those pages in the user data area. Such content-based digests are examples of what are more generally referred to herein as "content-based signatures" of the respective user data pages 112. The hash metadata generated by the content addressable storage system 105 is illustratively stored as metadata pages 110 in the metadata area.

The generation and storage of the hash metadata is assumed to be performed under the control of the storage controller 108. The hash metadata may be stored in the metadata area in a plurality of entries corresponding to respective buckets each comprising multiple cache lines, although other arrangements can be used.

Figure 2:
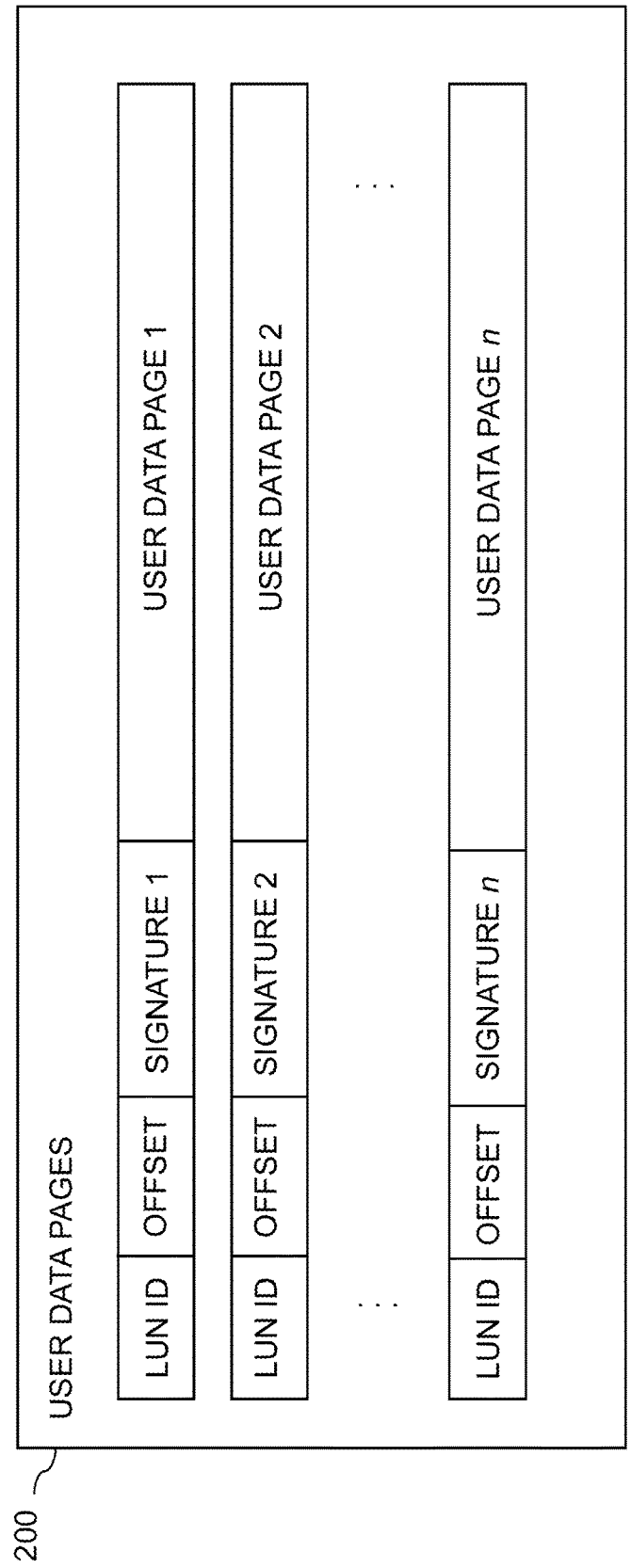
FIG. 2 shows an example of a set of user data pages in an illustrative embodiment.

Each of the metadata pages 110 characterizes a plurality of the user data pages 112. For example, as illustrated in FIG. 2, a given set of user data pages 200 representing a portion of the user data pages 112 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106 of the content addressable storage system 105.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

Figure 3:
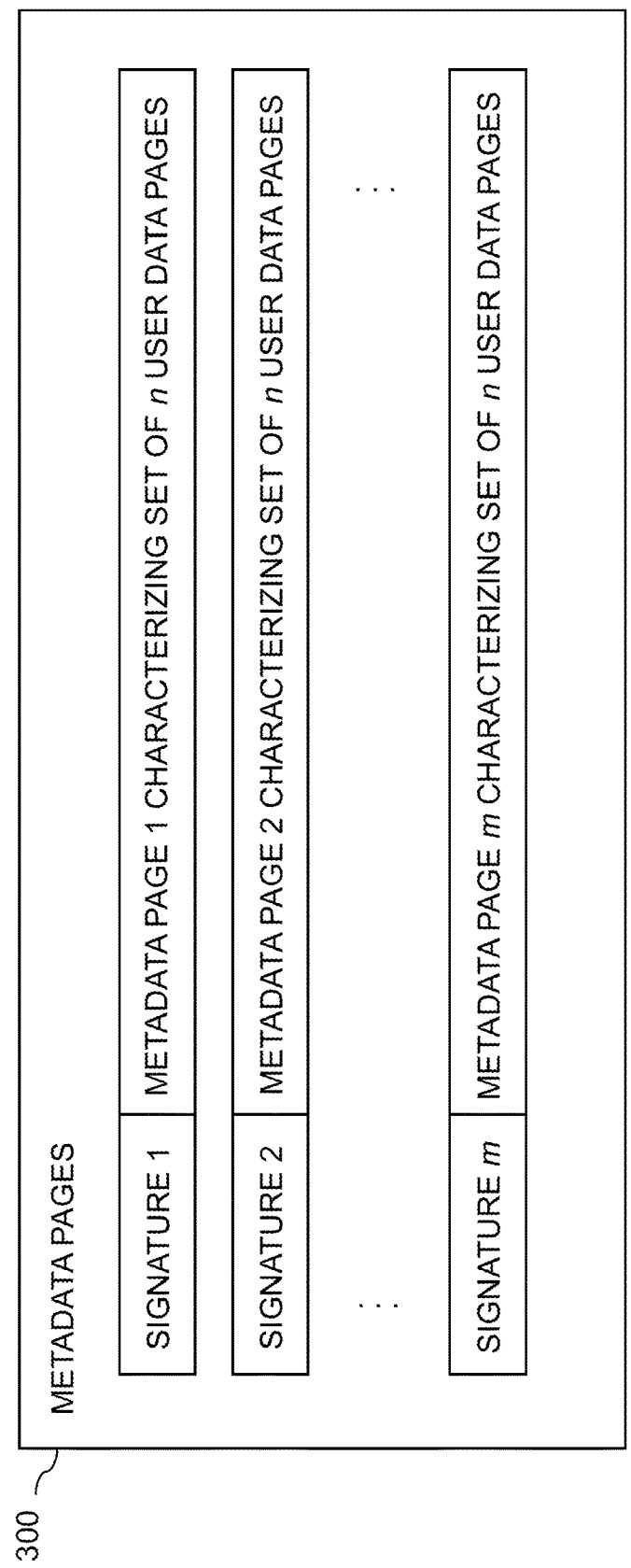
FIG. 3 shows an example of a set of metadata pages in an illustrative embodiment.

This is illustrated in FIG. 3, which shows a given set of metadata pages 300 representing a portion of the metadata pages 110 in an illustrative embodiment. The metadata pages in this example include metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations shown in FIGS. 2 and 3 are examples only, and numerous alternative user data and metadata page configurations can be used in other embodiments.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, the additional storage nodes 120 may be part of another clustered storage system of the system 100. Each of the storage nodes 115 and 120 of the system 100 is assumed to be implemented using at least one processing device comprising a processor coupled to a memory.

The storage controller 108 of the content addressable storage system 105 is implemented in a distributed manner so as to comprise a plurality of distributed storage controller components implemented on respective ones of the storage nodes 115 of the content addressable storage system 105. The storage controller 108 is therefore an example of what is more generally referred to herein as a "distributed storage controller." In subsequent description herein, the storage controller 108 may be more particularly referred to as a distributed storage controller.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The distributed storage controller 108 in the present embodiment is configured to implement functionality for decoupling and reordering of logical and physical capacity release in the content addressable storage system 105.

As noted above, the storage devices 106 are configured to store user data pages 200 and metadata pages 300 in respective user data page and metadata page areas. Each of the user data pages 200 comprises a logical address and a content-based signature derived from content of that data page, and each of the metadata pages 300 characterizes a plurality of the user data pages 200 and associates the content-based signatures of those user data pages with respective physical blocks in the storage devices 106.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Communication links may be established between the various processing modules of the distributed storage controller 108 using well-known communication protocols such as Transmission Control Protocol (TCP) and Internet Protocol (IP). For example, respective sets of IP links used in data transfer and corresponding messaging could be associated with respective different ones of the routing modules 108R.

Ownership of a user data logical address space within the content addressable storage system 105 is illustratively distributed among the control modules 108C. The management module 108M may include a capacity release engine or other arrangement of capacity release control logic that engages corresponding capacity release control logic instances in all of the control modules 108C and routing modules 108R in order to implement a decoupled and reordered logical and physical capacity release process within the system 100, as will be described in more detail below in conjunction with FIG. 4. It is desirable in these and other storage system contexts to implement functionality for decoupling and reordering of logical and physical capacity release across multiple distributed processing modules, such as the processing modules 108C, 108D, 108R and 108M of the distributed storage controller 108.

In some embodiments, the content addressable storage system 105 comprises an XtremIO™ storage array suitably modified to incorporate decoupled and reordered logical and physical capacity release techniques as disclosed herein. In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, functionality for decoupling and reordering of logical and physical capacity release in some embodiments is implemented under the control of at least one system-wide management module of the distributed storage controller 108, utilizing the C-modules, D-modules and R-modules of the XtremIO™ storage array.

In the above-described XtremIO™ storage array example, each user data page typically has a size of 8 KB and its content-based signature is a 20-byte signature generated using an SHA1 hash function. Also, each page has a LUN identifier and an offset, and so is characterized by <lun_id, offset, signature>.

The content-based signature in the present example is also referred to as a "hash handle" of the corresponding data page, as the content-based signature is generated by applying a hash function such as SHA1 to the content of that data page.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Each of the storage nodes 115 of the storage system 105 comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

The term "write request" as used herein is intended to be broadly construed, so as to encompass one or more IO operations directing that at least one data item of a storage system be written to in a particular manner. A given write request is illustratively received in a storage system from a host device. For example, in some embodiments, a write request is received in a distributed storage controller of the storage system, and directed from one processing module to another processing module of the distributed storage controller. More particularly, in the embodiment to be described below in conjunction with FIG. 4, a received write request is directed from a routing module of the distributed storage controller to a particular control module of the distributed storage controller. Other arrangements for receiving and processing write requests from one or more host devices can be used.

Figure 4:
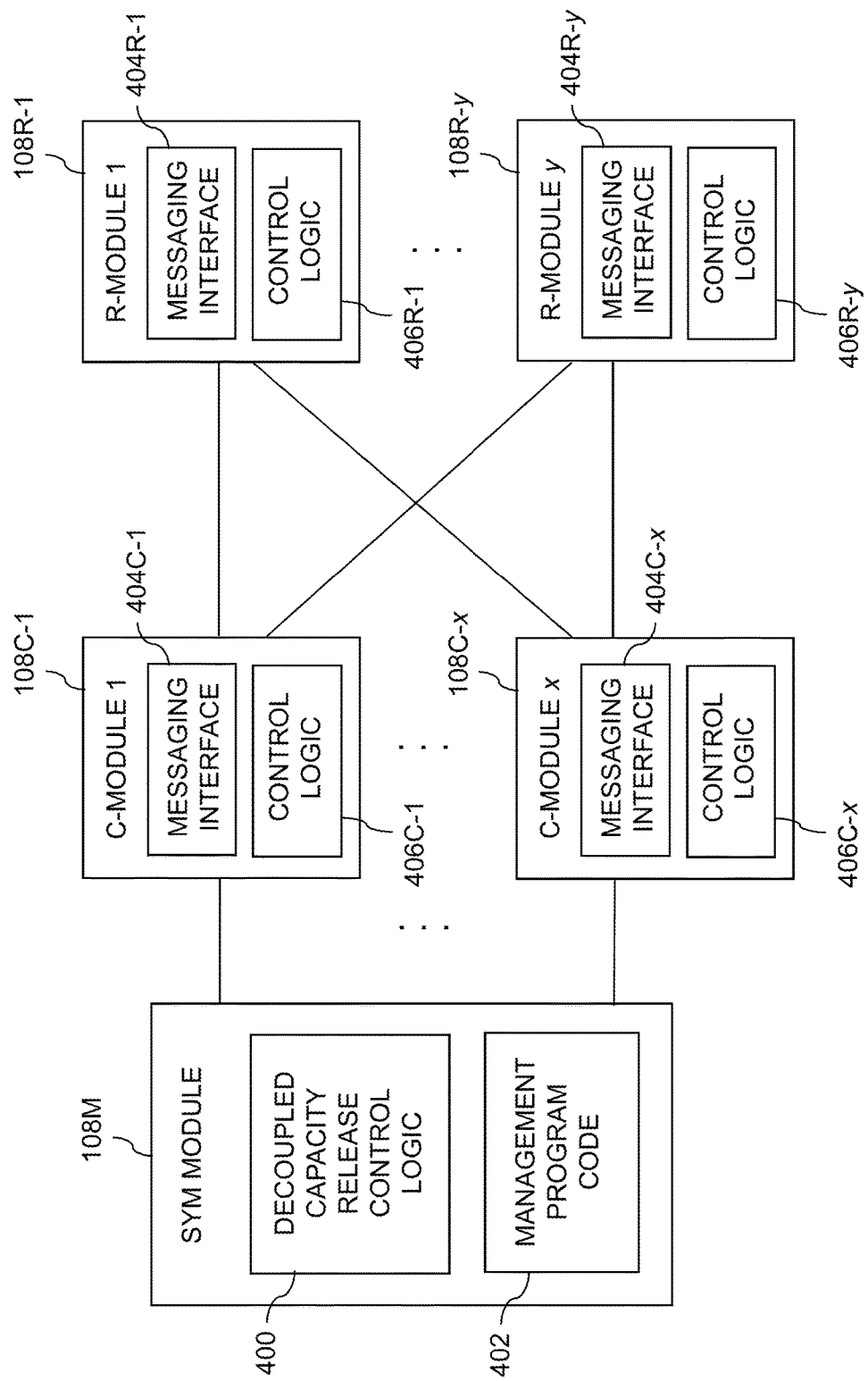
FIG. 4 illustrates a portion of a distributed storage controller of a content addressable storage system showing one possible arrangement supporting decoupling and reordering of logical and physical capacity removal.

Referring now to FIG. 4, a more detailed view of a portion of the distributed storage controller 108 in an illustrative embodiment is shown. This embodiment illustrates an example of communications between control modules 108C and routing modules 108R of the distributed storage controller 108.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises decoupled capacity release control logic 400 and associated management program code 402. The management module 108M communicates with control modules 108C-1 through 108C-x, also denoted as C-module 1 through C-module x. The control modules 108C communicate with routing modules 108R-1 through 108R-y, also denoted as R-module 1 through R-module y. The variables x and y are arbitrary integers greater than one, and may but need not be equal. In some embodiments, each of the storage nodes 115 of the content addressable storage system 105 comprises one of the control modules 108C and one of the routing modules 108R, as well as one or more additional modules including one of the data modules 108D.

The control modules 108C-1 through 108C-x in the FIG. 4 embodiment comprise respective messaging interfaces 404C-1 through 404C-x. These messaging interfaces 404C are utilized by corresponding instances of control logic 406C-1 through 406C-x to generate, receive and otherwise process messages in conjunction with a decoupled and reordered logical and physical capacity release process.

For example, the messaging interfaces 404C are utilized to generate control-to-routing messages for transmission to the routing modules 108R, and to process routing-to-control messages received from the routing modules 108R. The messaging interfaces 404C also generate messages for transmission to the management module 108M and process instructions and other messages received from the management module 108M in conjunction with performing functions associated with implementation of the decoupled and reordered logical and physical capacity release.

The routing modules 108R-1 through 108R-y in the FIG. 4 embodiment comprise respective messaging interfaces 404R-1 through 404R-y. These messaging interfaces 404R are utilized by corresponding instances of control logic 406R-1 through 406R-y to generate routing-to-control messages for transmission to one or more of the control modules 108C and to process control-to-routing messages received from one or more of the control modules 108C in conjunction with performing functions associated with implementation of the decoupled and reordered logical and physical capacity release.

The manner in which decoupled and reordered logical and physical capacity release is provided in the FIG. 4 embodiment will now be described. The process is assumed to be carried out by the processing modules 108C, 108D, 108R and 108M. It is further assumed that the control modules 108C write data pages in the content addressable storage system 105 via the data modules 108D in accordance with write requests received from host devices via the routing modules 108R. The host devices illustratively comprise respective ones of the compute nodes 102 of the computer system 101.

The write requests from the host devices identify particular data pages to be written in the storage system 105 by their corresponding logical addresses each comprising a LUN ID and an offset.

As noted above, a given one of the content-based signatures comprises a hash handle of the corresponding data page, with the hash handle being generated by applying a hash function to the content of that data page.

The storage system 105 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 105.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 106. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

Execution of a given write request received in the storage system 105 from a host device illustratively involves the following operations:

1. Receive the write request in a particular control module 108C from a particular routing module 108R.

2. Acquire CIO address range lock for the logical address range to be written, where CIO refers to an IO process component in the control module 108C. As noted above, the control modules have ownership of particular logical address spaces, and the CIO address therefore denotes a global logical address for a given storage block.

3. Perform a read-modify operation if the write is a small or unaligned write. Examples of read-modify operations for use with small or unaligned writes can be found in the above-cited U.S. Pat. No. 9,104,326.

4. Write the data pages to a data module 108D, based on a hash-to-data ("H2D") table. New hash handles are generated for the respective data pages, and reference counts associated with the new hash handles are incremented.

5. Release the CIO address range lock.

6. Send a response back to the requesting routing module 108R.

7. Decrement reference counts associated with the old hash handles of respective data pages that have been overwritten. These are examples of what are more generally referred to herein as "dereferencing operations."

The reference counts mentioned above are illustratively maintained for respective physical blocks in the storage devices 106 and each such reference count indicates for its corresponding physical block the number of logical blocks that point to that same physical block. When all logical block references to a given physical block are removed, the reference count for that physical block becomes zero and its capacity can be released. A given "dereferencing operation" as that term is broadly used herein is intended to encompass decrementing of a reference count associated with a physical block.

As mentioned previously, in conjunction with release of logical address space in the storage system 105, the storage controller 108 makes the released logical address space available to users in a first order based at least in part on released logical address, accumulates multiple dereferencing operations for respective ones of the physical blocks corresponding to the released logical address space, and executes the accumulated dereferencing operations for the physical blocks in a second order that differs from the first order.

The logical address space illustratively comprises one or more ranges of logical block addresses (LBAs) each comprising a LUN ID and an offset. For example, each LBA can identify a particular one of the user data pages 200. The LBAs each correspond to one or more physical blocks in the storage devices 106. Other types of LBAs and logical address spaces can be used in other embodiments. The term "logical address" as used herein is therefore intended to be broadly construed.

A given such logical address space may be released responsive to deletion of a corresponding storage volume, snapshot or any other arrangement of data stored in the storage system 105. Other conditions within the storage system 105 can also result in release of logical address space.

The storage controller 108 makes the released logical address space available to users in a first order comprises by making the released logical address space available to users in order of released logical address. More particularly, the storage controller 108 can make the released logical address space available to users in order of released logical address by making each of its corresponding released logical addresses immediately available responsive to that logical address being released. For example, release of one or more LBAs or a range of LBAs by one or more users can result in those LBAs being made available to one or more other users in the same order in which the LBAs are released. However, the corresponding physical blocks are released in a different order, through accumulation and reordered execution of dereferencing operations as will be described below.

The storage controller 108 in some embodiments accumulates multiple dereferencing operations for each of at least a subset of the metadata pages 300, and executes the accumulated dereferencing operations for a given one of the metadata pages 300 responsive to the accumulated dereferencing operations for the given metadata page reaching a threshold number of dereferencing operations.

The storage controller 108 may be configured to adjust the threshold number of dereferencing operations over time based at least in part on variations in IO processing load of the storage system 105. For example, the threshold number of dereferencing operations may be selected so as to achieve a target dereferencing amortization rate for one or more of the metadata pages 300. Also, different threshold numbers may be selected for different ones of the metadata pages 300. For example, it may be desirable to establish different threshold numbers for different types of metadata pages in order to achieve different target dereferencing amortization rates for the different types of metadata pages. A given target dereferencing amortization rate illustratively provides release of physical blocks at a rate sufficient to satisfy physical block demand of user IO processing requirements in storage system 105.

In some embodiments, accumulating multiple dereferencing operations for respective ones of the physical blocks corresponding to the released logical address space further comprises aggregating the multiple dereferencing operations into additional pages of a particular data type, and writing the additional pages to a persistent memory of the storage system 105. Such a persistent memory may comprise, for example, a designated portion of one or more of the storage devices 106.

Executing of the accumulated dereferencing operations for the physical blocks illustratively comprises retrieving the additional pages from the persistent memory, determining if the additional pages include at least a threshold number of dereferencing operations for each of one or more of the metadata pages 300, and executing the dereferencing operations for any of the metadata pages having at least the threshold number of dereferencing operations. Again, different threshold numbers can be established within the storage system 105 for respective different types of metadata pages.

In executing the accumulated dereferencing operations for the physical blocks, execution of each of the dereferencing operations more particularly involves decrementing a reference count of a corresponding one of the physical blocks, and releasing the physical block responsive to the reference count reaching a designated number, such as zero. Moreover, in executing the accumulated dereferencing operations for the physical blocks, at least a subset of the accumulated dereferencing operations are first reordered into an order that more closely matches a physical layout of the corresponding physical blocks on the storage devices 106. The reordered dereferencing operations are then executed in that order.

As a result, the physical blocks are released in the storage system 105 in a different order than that in which their corresponding logical blocks are released. This provides a number of significant advantages that will be described in more detail below.

The above-described operations of the control modules 108C and routing modules 108R are carried out under the control of their respective control logic instances 406C and 406R in cooperation with the decoupled capacity release control logic 400 and management program code 402 of the management module 108M. The control and routing modules of the distributed storage controller 108 therefore collectively implement portions of a decoupled and reordered logical and physical capacity release process under the control of management module 108M as disclosed herein.

As a more particular example in the XtremIO™ context, a process for decoupling and reordering of logical and physical capacity release is advantageously configured to provide highly efficient release of both logical and physical capacity in the storage system. This is achieved in some embodiments by decoupling logical capacity release from physical capacity release in a manner that permits logical and physical capacity release to be carried out in respective different orders each better suited to its corresponding capacity type, thereby avoiding the inefficiencies of conventional tightly coupled arrangements. Storage system performance is therefore significantly improved.

The C-modules, D-modules and R-modules of the storage nodes in this context are assumed to be configured to communicate with one another over a high-speed internal network such as an InfiniBand (TB) network. The C-modules, D-modules and R-modules coordinate with one another to accomplish various TO processing tasks.

In this example, logical block addresses or LBAs of a logical layer of the storage system 105 correspond to respective physical blocks of a physical layer of the storage system 105. The user data pages of the logical layer are organized by LBA and have reference via respective content-based signatures to particular physical blocks of the physical layer.

Each of the physical blocks has an associated reference count that is maintained within the storage system. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

As mentioned previously, conventional arrangements can be problematic in that release of logical capacity is typically tightly coupled with release of corresponding physical capacity. For example, a given logical block and its corresponding physical block may be released substantially simultaneously by executing the dereferencing operation to decrement the physical block reference count in conjunction with release of the given logical block. If the dereferencing operation results in a reference count of zero, the physical block can be immediately released, substantially contemporaneously with the release of the corresponding logical block. However, this approach creates inefficiencies that can significantly undermine system performance. For example, simultaneous deletion of a large number of storage volumes can cause massive amounts of logical and physical capacity release, necessitating excessive consumption of system resources for updating of metadata pages and resulting in a corresponding significant degradation in IO processing throughput.

Conventional systems with tight coupling of logical and physical capacity release also fail to recognize that physical blocks are typically ordered in a substantially different manner than logical blocks within a storage system. Dereferencing physical blocks in the same order in which the logical blocks are released results in the above-noted suboptimal processing within the storage system, and fails to adapt the release of physical capacity to the particular manner in which the physical blocks are organized.

The functionality for decoupling and reordering of logical and physical capacity removal in this particular example is advantageously configured to avoid these and other problems of conventional arrangements.

This functionality illustratively comprises a process that includes at least the following operations:

1. Logical capacity is released in order of released LBA and made immediately available for client use.

2. References to physical blocks that are to be subject to dereferencing operations as a result of the release of logical capacity are aggregated in relatively large pages which are written together as a special data type to persistent memory. This aggregation continues until a threshold is met that ensures that a target dereferencing amortization rate can be achieved. For example, the aggregation can continue until the reference change set is sufficiently large to result in an efficient amount of reference changes per metadata page.

3. The aggregated references are loaded from persistent memory and then sorted to better match the actual physical layout of the storage system. The reordered reference changes are then executed. For example, all the reference changes to be applied to a certain metadata page are grouped and executed together.

4. Physical capacity is removed from the storage system in an order corresponding to the efficient execution of the dereferencing operations. The rate of the physical capacity release is generally set slightly higher than a rate at which new physical blocks are required for client IO processing, so as to ensure highly efficient amortization while also avoiding an out-of-space scenario. The physical capacity release rate can be adjusted as necessary in order to accommodation variations in IO processing demands.

The above-described example process implementation advantageously avoids the problems associated with conventional tight coupling of logical and physical capacity removal within a storage system. Logical capacity can be immediately released to client use, for example, in order of released LBAs, while the metadata update requirements associated with physical capacity removal are amortized in a highly efficient manner that is well-matched to the physical characteristics of the storage system so as to produce little or no impact on client IO processing performance.

The following description provides an additional illustration of advantages obtained in some embodiments using the above-described example process.

In one such embodiment, it is assumed that logical metadata is ordered similarly to the LUN layout and therefore its orderly deletion is very effective. For example, for a given LUN, the logical metadata of logical addresses X and X+1 would be very close, probably in the same metadata physical page, so it is likely that numerous logical metadata changes will be committed by a single metadata page write. However, for physical metadata there is no such locality, as the physical metadata is ordered by randomly distributed tokens (e.g., address X's physical metadata may map to a metadata page completely unrelated to the metadata page for address X+1). If there is a total of NMD such metadata pages, the probability of two consecutive logical addresses being in the same metadata page is 1/NMD, and so each metadata page write will likely commit only a single change.

As a result, if physical capacity were to be released in the same orderly manner as logical capacity (e.g., in order of logical address), the performance achieved for removal of the physical capacity would be poor relative to that achieved for the logical capacity. Illustrative embodiments solve this problem by decoupling the logical and physical capacity removal in the manner previously described.

For example, the process described above may be configured to group a large number of addresses (X, X+1 . . . X+N), where N is sufficiently large to achieve a significant number of changes per metadata page write, so that N/NMD will yield a number that provides a desired level of performance for release of physical capacity. The number N may be under the control of an operator of the storage system 105, and represents a tradeoff between delete amortization (max(1,N/NMD)) and lag (N, or how many addresses can be deleted, but have not actually been deleted yet). This decoupling provides much quicker logical volume and snapshot deletion that is completely separate from the physical capacity release. Moreover, it results in actual work savings. For example, if N/NMD=1, the same metadata page would be accessed and written multiple times, but if N/NMD=4, there will be four times less work involved in committing the same changes. The N/NMD tradeoff can be subject to static and dynamic control to accommodate various operating conditions (e.g., if more space is needed, N/NMD can be reduced in order to have a lower value of N).

The example process described above is executed at least in part utilizing control logic instances 400, 406C and 406R of the respective storage node processing modules 108M, 108C and 108R of the storage system 105.

It is to be appreciated that the particular process steps are exemplary only, and can be varied in other embodiments.

Also, the particular interconnection and signaling arrangements illustrated for processing modules 108C, 108R and 108M in FIG. 4 are presented by way of example only, and can be varied in other embodiments.

In some embodiments, the control logic instances of these processing modules comprise respective portions of a capacity release engine of the storage controller 108.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for decoupling and reordering of logical and physical capacity release in a clustered storage system in other embodiments.

Although illustratively shown as being implemented within the content addressable storage system 105, the storage controller 108 in other embodiments can be implemented at least in part within the computer system 101, in another system component, or as a stand-alone component coupled to the network 104.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments at least portions of the computer system 101 and the content addressable storage system 105 are implemented on the same processing platform. The content addressable storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the compute nodes 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as computer system 101, compute nodes 102, network 104, content addressable storage system 105, storage devices 106, storage controller 108 and storage nodes 115 and 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, in some illustrative embodiments a given content addressable storage system or other type of storage system with functionality for decoupling and reordering of logical and physical capacity release can be offered to cloud infrastructure customers or other users as a PaaS offering.

Figure 5:
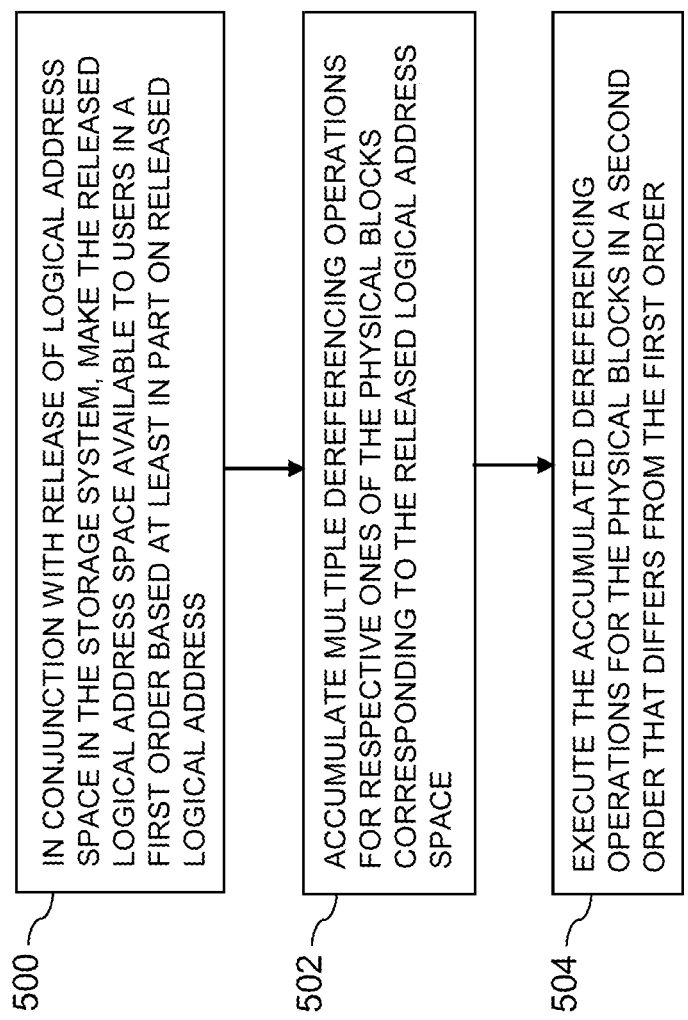
FIG. 5 is a flow diagram of a process for decoupling and reordering of logical and physical capacity removal in an illustrative embodiment.

Additional details of illustrative embodiments will now be described with reference to the flow diagram of FIG. 5. FIG. 5 more particularly shows an example of a logical and physical capacity release decoupling and reordering process implemented in storage system such as content addressable storage system 105 of the FIG. 1 embodiment. The content addressable storage system 105 may comprise a scale-out all-flash storage array such as an XtremIO™ storage array. A given such storage array can be configured to provide storage redundancy using well-known RAID techniques such as RAID 5 or RAID 6, although other storage redundancy configurations can be used.

The term "storage system" as used herein is therefore intended to be broadly construed, and should not be viewed as being limited to content addressable storage systems or flash-based storage systems.

The storage devices of such a storage system illustratively implement a plurality of LUNs configured to store files, blocks, objects or other arrangements of data.

A given storage system can be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or LXCs, or combinations of both as in an arrangement in which Docker containers or other types of LXCs are configured to run on VMs.

As a more particular example, components of a distributed storage controller can each be implemented in the form of one or more LXCs running on one or more VMs. Other arrangements of one or more processing devices of a processing platform can be used to implement a distributed storage controller and/or its components. Other portions of the information processing system 100 can similarly be implemented using one or more processing devices of at least one processing platform.

The term "processing platform" as used herein is intended to be broadly construed so as to encompass, by way of illustration and without limitation, multiple sets of processing devices and associated storage systems that are configured to communicate over one or more networks.

The operation of the information processing system 100 will now be further described with reference to the flow diagram of the illustrative embodiment of FIG. 5. The process as shown includes steps 500 through 504, and is suitable for use in the system 100 but is more generally applicable to other types of information processing systems each comprising one or more storage systems. The steps are illustratively performed by cooperative interaction of control logic instances of processing modules of a distributed storage controller. A given such storage controller can therefore comprise a distributed storage controller implemented in the manner illustrated in FIGS. 1 and 4.

In step 500, in conjunction with release of logical address space in the storage system, the released logical address space is made available to users in a first order based at least in part on released logical address. For example, the released logic address space can be made immediately available in order of released logical address.

However, the corresponding physical blocks are not immediately released, but are instead processed in steps 502 and 504 below in a manner that results in the physical blocks being released in a different order than that in which the logical addresses are released, leading to significant performance advantages.

In step 502, multiple dereferencing operations are accumulated for respective ones of the physical blocks corresponding to the released logical address space.

In step 504, the accumulated dereferencing operations for the physical blocks are executed in a second order that differs from the first order.

For example, accumulating multiple dereferencing operations for respective ones of the physical blocks corresponding to the released logical address space and executing the accumulated dereferencing operations for the physical blocks may further comprise accumulating multiple dereferencing operations for each of at least a subset of the metadata pages, and executing the accumulated dereferencing operations for a given one of the metadata pages responsive to the accumulated dereferencing operations for the given metadata page reaching a threshold number of dereferencing operations.

In executing the accumulated dereferencing operations for the physical blocks, execution of each of the dereferencing operations more particularly involves decrementing a reference count of a corresponding one of the physical blocks, and releasing the physical block responsive to the reference count reaching a designated number, such as zero.

Such operations result in the physical blocks being released in a different order than that in which their corresponding logical blocks are released.

In some embodiments, executing the accumulated dereferencing operations for the physical blocks more particularly comprises reordering at least a subset of the accumulated dereferencing operations into an order that more closely matches a physical layout of the corresponding physical blocks on the storage devices, and executing the reordered dereferencing operations in that order. Again, the result is that the physical blocks are released in a different order than the corresponding logical blocks.

Different instances of the FIG. 5 process may be performed for respective different instances of release of logical address space for different portions of a storage system or different storage systems.

It is also to be appreciated that the FIG. 5 process and other features and functionality for decoupling and reordering of logical and physical capacity release as described above can be adapted for use with other types of information systems, including by way of example an information processing system in which the host devices and the storage system are both implemented on the same processing platform.

The particular processing operations and other system functionality described in conjunction with the flow diagram of FIG. 5 are presented by way of illustrative example only, and should not be construed as limiting the scope of the disclosure in any way. Alternative embodiments can use other types of processing operations for implementing decoupling and reordering of logical and physical capacity release. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different decoupled and reordered logical and physical capacity release processes for respective different storage systems or portions thereof within a given information processing system.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 that is configured to control performance of one or more steps of the FIG. 5 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, as well as other system components, may be implemented at least in part using processing devices of such processing platforms. For example, in a distributed implementation of the storage controller 108, respective distributed modules of such a storage controller can be implemented in respective LXCs running on respective ones of the processing devices of a processing platform.

In some embodiments, the storage system comprises an XtremIO™ storage array suitably modified to incorporate decoupled and reordered logical and physical capacity release techniques as disclosed herein.

As described previously, in the context of an XtremIO™ storage array, the control modules 108C, data modules 108D, routing modules 108R and management module(s) 108M of the distributed storage controller 108 in system 100 illustratively comprise C-modules, D-modules, R-modules and SYM module(s), respectively. These exemplary processing modules of the distributed storage controller 108 can be configured to implement decoupled and reordered logical and physical capacity release functionality in accordance with the FIG. 5 process.

The decoupled and reordered logical and physical capacity release techniques implemented in the embodiments described above can be varied in other embodiments. For example, different types of process operations can be used in other embodiments.

In addition, the above-described functionality associated with C-module, D-module, R-module and SYM module components of an XtremIO™ storage array can be incorporated into other processing modules or components of a centralized or distributed storage controller in other types of storage systems.

Illustrative embodiments of content addressable storage systems or other types of storage systems with functionality for decoupling and reordering of logical and physical capacity release as disclosed herein can provide a number of significant advantages relative to conventional arrangements.

For example, some embodiments can advantageously provide highly efficient release of both logical and physical capacity in the storage system.

This is achieved in some embodiments by decoupling logical capacity release from physical capacity release in a manner that permits logical and physical capacity release to be carried out in respective different orders each better suited to its corresponding capacity type, thereby avoiding the inefficiencies of conventional tightly coupled arrangements. Storage system performance is therefore significantly improved.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage system 105, or portions thereof, is illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
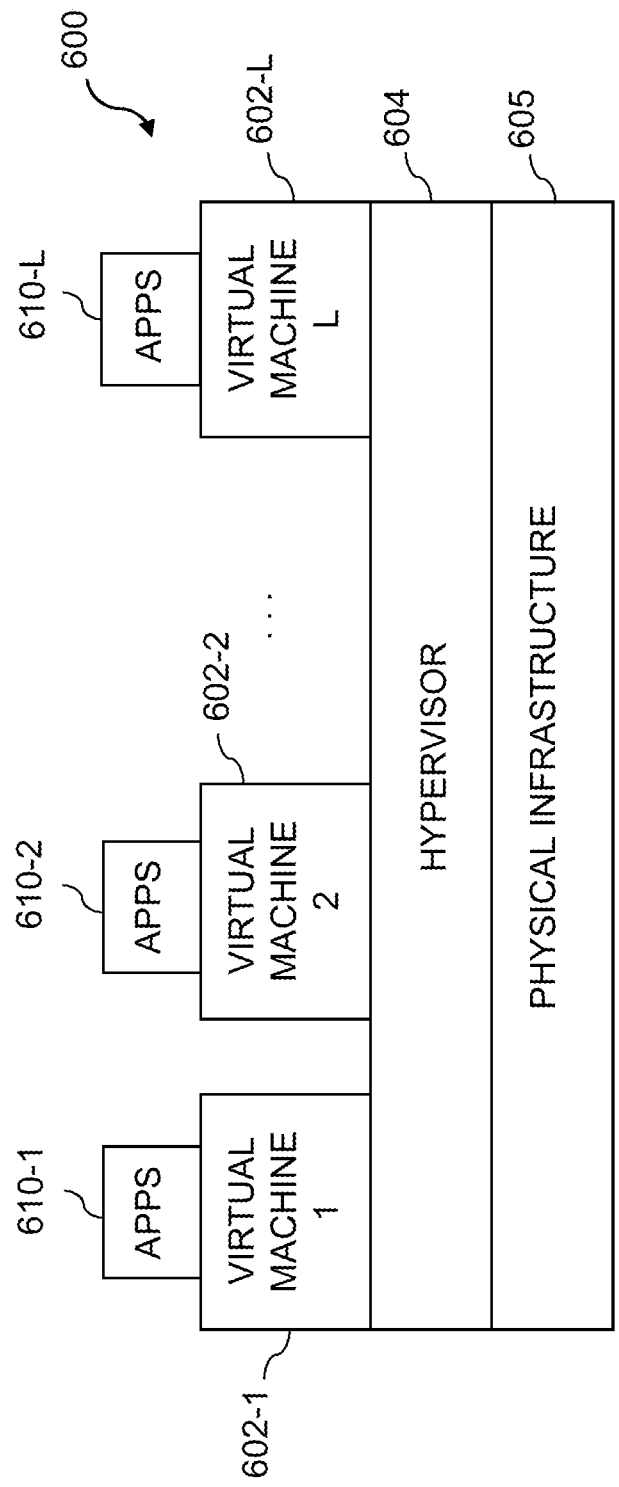

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controller 108 of system 100 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage nodes, storage devices, storage controllers, processing modules, storage capacity release processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and an associated storage controller;
the storage devices being configured to store user data pages and metadata pages, each of the user data pages having a logical address and a content-based signature derived from content of that data page, each of the metadata pages characterizing a plurality of the user data pages and associating the content-based signatures of those user data pages with respective physical blocks in the storage devices;
wherein in conjunction with release of logical address space in the storage system, the storage controller is configured:
to make the released logical address space available to users in a first order based at least in part on released logical address;
to accumulate multiple dereferencing operations for respective ones of the physical blocks corresponding to the released logical address space; and
to execute the accumulated dereferencing operations for the physical blocks in a second order that differs from the first order;
wherein the storage controller is implemented using at least one processing device comprising a processor coupled to a memory.

2. The apparatus of claim 1 wherein making the released logical address space available to users in a first order comprises making the released logical address space available to users in order of released logical address.

3. The apparatus of claim 2 wherein making the released logical address space available to users in order of released logical address further comprises making each released logical address immediately available responsive to that logical address being released.

4. The apparatus of claim 1 wherein accumulating multiple dereferencing operations for respective ones of the physical blocks corresponding to the released logical address space and executing the accumulated dereferencing operations for the physical blocks further comprise:
accumulating multiple dereferencing operations for each of at least a subset of the metadata pages; and
executing the accumulated dereferencing operations for a given one of the metadata pages responsive to the accumulated dereferencing operations for the given metadata page reaching a threshold number of dereferencing operations.

5. The apparatus of claim 4 wherein the storage controller is further configured to adjust the threshold number of dereferencing operations over time based at least in part on variations in input-output processing load of the storage system.

6. The apparatus of claim 4 wherein the threshold number of dereferencing operations is selected so as to achieve a target dereferencing amortization rate for one or more of the metadata pages.

7. The apparatus of claim 6 wherein the target dereferencing amortization rate provides release of physical blocks at a rate sufficient to satisfy physical block demand of user input-output processing requirements.

8. The apparatus of claim 1 wherein accumulating multiple dereferencing operations for respective ones of the physical blocks corresponding to the released logical address space further comprises:
aggregating the multiple dereferencing operations into additional pages of a particular data type; and
writing the additional pages to a persistent memory of the storage system.

9. The apparatus of claim 8 wherein executing the accumulated dereferencing operations for the physical blocks further comprises:
retrieving the additional pages from the persistent memory;
determining if the additional pages include at least a threshold number of dereferencing operations for each of one or more of the metadata pages;
executing the dereferencing operations for any of the metadata pages having at least the threshold number of dereferencing operations.

10. The apparatus of claim 1 wherein executing the accumulated dereferencing operations for the physical blocks comprises for each of the dereferencing operations:
decrementing a reference count of a corresponding one of the physical blocks; and
releasing the physical block responsive to the reference count reaching a designated number.

11. The apparatus of claim 10 wherein the designated number is zero.

12. The apparatus of claim 1 wherein executing the accumulated dereferencing operations for the physical blocks comprises:
reordering at least a subset of the accumulated dereferencing operations into an order that more closely matches a physical layout of the corresponding physical blocks on the storage devices; and
executing the reordered dereferencing operations in that order.

13. The apparatus of claim 1 wherein a given one of the content-based signatures comprises a hash handle of the corresponding data page with the hash handle being generated by applying a hash function to the content of that data page.

14. The apparatus of claim 1 wherein the storage system comprises a clustered storage system having a plurality of storage nodes each having a plurality of storage devices and wherein the storage controller is implemented in a distributed manner so as to comprise a plurality of distributed storage controller components implemented on respective ones of the storage nodes of the clustered storage system.

15. A method comprising:
configuring storage devices of a storage system to store user data pages and metadata pages, each of the user data pages having a logical address and a content-based signature derived from content of that data page, each of the metadata pages characterizing a plurality of the user data pages and associating the content-based signatures of those user data pages with respective physical blocks in the storage devices;

in conjunction with release of logical address space in the storage system:
  making the released logical address space available to users in a first order based at least in part on released logical address;
  accumulating multiple dereferencing operations for respective ones of the physical blocks corresponding to the released logical address space; and
  executing the accumulated dereferencing operations for the physical blocks in a second order that differs from the first order;
wherein the method is implemented by at least one processing device comprising a processor coupled to a memory.

16. The method of claim 15 wherein accumulating multiple dereferencing operations for respective ones of the physical blocks corresponding to the released logical address space and executing the accumulated dereferencing operations for the physical blocks further comprise:
  accumulating multiple dereferencing operations for each of at least a subset of the metadata pages; and
  executing the accumulated dereferencing operations for a given one of the metadata pages responsive to the accumulated dereferencing operations for the given metadata page reaching a threshold number of dereferencing operations.

17. The method of claim 15 wherein executing the accumulated dereferencing operations for the physical blocks comprises:
  reordering at least a subset of the accumulated dereferencing operations into an order that more closely matches a physical layout of the corresponding physical blocks on the storage devices; and
  executing the reordered dereferencing operations in that order.

18. A computer program product comprising a non-transitory processor-readable storage medium having stored therein program code of one or more software programs, wherein the program code when executed by at least one processing device causes said at least one processing device:
  to configure storage devices of a storage system to store user data pages and metadata pages, each of the user data pages having a logical address and a content-based signature derived from content of that data page, each of the metadata pages characterizing a plurality of the user data pages and associating the content-based signatures of those user data pages with respective physical blocks in the storage devices;
  in conjunction with release of logical address space in the storage system:
  to make the released logical address space available to users in a first order based at least in part on released logical address;
  to accumulate multiple dereferencing operations for respective ones of the physical blocks corresponding to the released logical address space; and
  to execute the accumulated dereferencing operations for the physical blocks in a second order that differs from the first order.

19. The computer program product of claim 18 wherein accumulating multiple dereferencing operations for respective ones of the physical blocks corresponding to the released logical address space and executing the accumulated dereferencing operations for the physical blocks further comprise:
  accumulating multiple dereferencing operations for each of at least a subset of the metadata pages; and
  executing the accumulated dereferencing operations for a given one of the metadata pages responsive to the accumulated dereferencing operations for the given metadata page reaching a threshold number of dereferencing operations.

20. The computer program product of claim 18 wherein executing the accumulated dereferencing operations for the physical blocks comprises:
  reordering at least a subset of the accumulated dereferencing operations into an order that more closely matches a physical layout of the corresponding physical blocks on the storage devices; and
  executing the reordered dereferencing operations in that order.

* * * * *